May 28, 1957 R. FASZCZUK 2,793,704
DRIVING DEVICE FOR SLEIGHS
Filed Sept. 14, 1954 2 Sheets-Sheet 1
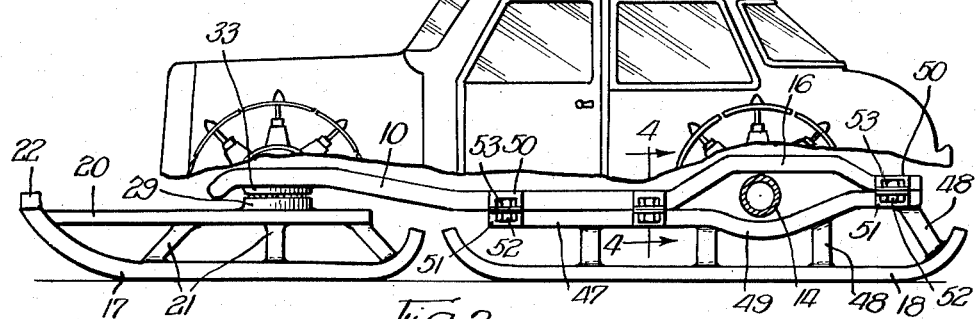
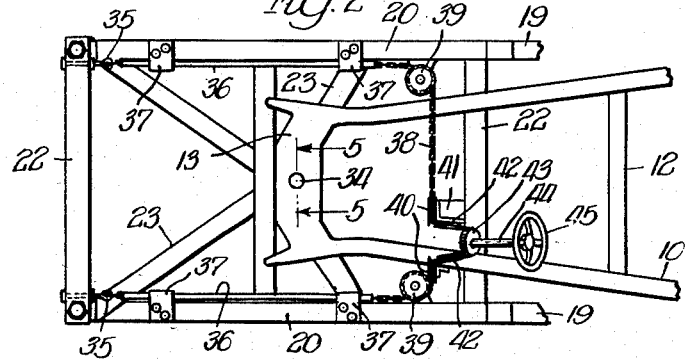
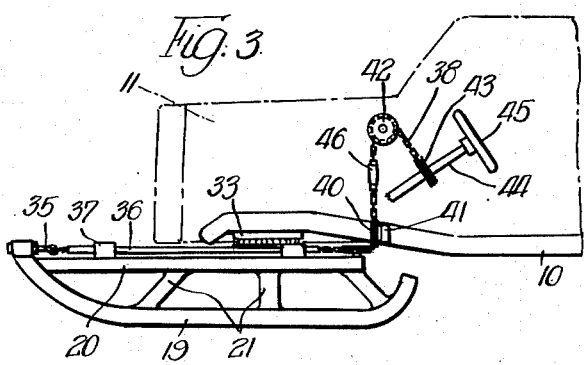
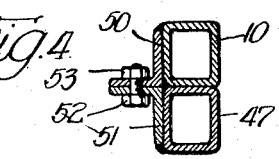
INVENTOR.
Roman Faszczuk,
BY B. Pelechowicz
atty May 28, 1957  R. FASZCZUK  2,793,704
DRIVING DEVICE FOR SLEIGHS
Filed Sept. 14, 1954                    2 Sheets-Sheet 2

INVENTOR.
Roman Faszczuk
BY
Atty

United States Patent Office 2,793,704
Patented May 28, 1957

2,793,704

DRIVING DEVICE FOR SLEIGHS

Roman Faszczuk, Chicago, Ill.

Application September 14, 1954, Serial No. 455,980

2 Claims. (Cl. 180—6)

The present invention relates to automobile sleighs and has for its main object the provision of sleighs which may be readily converted from a motor vehicle.

Another object of the present invention is the provision of suitable propulsion wheels affixable to automobile wheels when a motor vehicle is converted into sleighs.

A still further object of the present invention is the provision of a suitable wheel for propelling the vehicle when the same has been converted into a sleigh, and which wheel may embody a plurality of radial rods or spokes, which upon striking the snow or the ground as the wheel rotates would propel the sleigh forward.

A still further object of the present invention is the provision of a wheel of the character indicated wherein each spoke is supportable upon and within a suitable cage which may be disassembled from the wheel and removed therefrom when a new spoke is required to be substituted for the removed one.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views:

Fig. 1 is a side elevational view of a motor vehicle, with the body thereof partly cut away, when the same has been converted into a motor sleigh;

Fig. 2 is a top elevational view of the front runners of the sleigh illustrating the connection thereof with the front end of an automobile chassis, and further illustrating the mechanism for lateral steering of the front runners with relation to the chassis of the vehicle;

Fig. 3 is a side elevational view of the front runners further illustrating in side elevation the steering mechanism therefor;

Fig. 4 is an enlarged cross sectional view on line 4—4 of Fig. 1;

Figure 5:
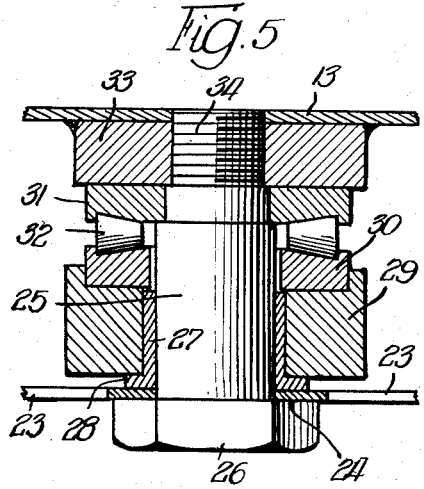
Fig. 5 is an enlarged vertical cross sectional view through the pivot connection between the chassis and the front runners of the sleigh, taken on line 5—5 of Fig. 2.

Referring to the present drawings in detail there is shown therein an automobile vehicle, convertible into a sleigh, and which includes chassis 10, upon which an automobile body 11 is supported in the usual manner.

Said chassis 10 includes a pair of frame bars, as is shown in Fig. 2. The two chassis frame bars are connected by one or more transverse bars 12, including the front transverse bar 13. The front end of said chassis 10 is narrower than the rear end thereof.

Supported below chassis 10 is axle housing 14, within which a conventional rear axle (not shown) is supportable. Said rear axle connects with a conventional wheel hub 15 (Fig. 7) upon which the wheel later described is carried. The rear end of said chassis 10 has an upwardly extending offset 16 below which said axle housing 14 is positioned.

The front wheels are supported below the front end of chassis 10 in the usual manner.

To convert the motor vehicle into a sleigh the automobile wheels need not be removed, but the sleigh propelling wheels should be added to the former, as will be later described. The conversion will necessitate however adding to the automobile the front sled generally indicated by 17 in Fig. 1, and rear sled generally indicated by 18 in Fig. 1.

The front sled 17 includes a pair of runners 19, above which a pair of longitudinal frame bars 20 are disposed in a parallel relation. Said runners and said frame bars are connected by a plurality of substantially vertical struts 21. A plurality of transverse bars 22 connect with said longitudinal bars 20 for maintaining the runners in their mutual operative position.

A pair of cross bars 23 extending from each of said longitudinal bars 20 are directed towards the center of the front sled 17, and the inner ends of said four cross bars 23 meet to define plate 24 (Fig. 5). Said plate 24 supports the pivot, best shown in Fig. 5, which connects the front end of chassis 10 with the front sled 17.

Said pivot includes bolt 25 having at its lower end an integrally formed head 26 which engages the lower face of said plate 24. Insertable over said bolt 25 is flanged boss 27, the flange 28 of which rests upon said plate 24. Supported upon said flange 28 is race supporting lug 29, which supports the lower ball bearing race 30. Coacting with said race 30 is the upper race 31. Disposed between the two races is a series of ball or roller bearings 32. Resting upon said upper race 31 is lug 33 which is welded or otherwise rigidly affixed to the underface of the front transverse bar 13 of the chassis. The upper end of said bolt 25 is reduced and threaded, as at 34 and engages in a threaded relation said lug 33 and said transverse bar 13.

The pivot aforesaid permits angular swinging motions of front sled 17 in either direction, with relation to the chassis, for the purpose of steering the sleigh.

The steering mechanism aforesaid includes a pair of eye bolts 35, each connected to one end of the frontmost transverse bar 22. Connecting with each of said eye bolts 35 is rod 36. The two rods are supported within brackets 37 for longitudinal sliding movement. Said brackets 37 are affixed to longitudinal bars 20.

Connecting with the rear ends of said rods 36 is sprocket chain 38, the ends of which are passed over a pair of horizontally disposed sprocket wheels 39 supportable upon said longitudinal frame bars 20.

Said chain 38 past said sprocket wheels 39 is passed over vertical sprocket wheels 40, which may be supported upon brackets 41 affixed either to the chassis 10 or to the one of the transverse bars 22. From there the two portions of sprocket chain 38 is directed upwardly to sprockets 42 supported upon the motor casing within the body. From there the chain is directed downwardly and at an angle and passed over sprocket wheel 43 supported upon steering post 44, the latter operable by means of steering wheel 45.

From the above description it will be readily apparent that when steering wheel 45 is turned to one or the opposite direction a pulling force will be exerted upon one or the opposite rod 36 for exerting pulling pressure upon the one or the opposite end of the frontmost transverse bar 22 for the purpose to turn sled 17 to one or the opposite direction depending upon the direction to which the steering wheel 45 has been turned. The turning of sled 17 is upon said pivot 25.

Tightening buckle 46 upon chain 38 adjusts the required tension of said chain 38. Said buckle 46 may be completely disconnected from the chain in order to remove the chain from the series of the pulleys thereby permitting the removal of the chain from the assembly as a prerequisite to the removal of sled 17 and the reconversion of the vehicle into an automobile. Once said chain 38 has been disconnected from the assembly the next step is the removal of the front sled 17. This is accomplished by unscrewing bolt 25 from lug 33 and the transverse bar 13.

The rear sled 18 constructed similarly to that of the front one 17 includes a pair of parallelly disposed runners with a pair of longitudinal bars 47, with which a plurality of upright struts 48 connect.

Adjacent its rear end said longitudinal bars 47 are each provided with a downwardly offset portion 49 disposed oppositely from said offsets 16 made in the rear end of chassis 10. Said offsets 16 and said portions 49 accommodate therebetween said axle housing 14.

Laterally each longitudinal bar of said chassis 10 is provided with angle pieces 50, which coact with like angle pieces 51 carried by the sides of the longitudinal bars 47 of rear sled 18. The horizontal portions of each of said angle pieces 50 and 51 remain in a contactual relation when the rear sled is in an operative position with the motor vehicle. For rigidly affixing the rear sled 18 to chassis 10 threaded bolts 52 are passed through the contacting horizontal portions of angle pieces 50 and 51, the free ends of which are engaged by nuts 53 for maintaining the chassis bars and longitudinal bars 47 in a stacked rigid relation as is clearly seen in Figs. 1 and 4. Said angle pieces 50 and 51 by their vertical portions are of course welded or otherwise rigidly affixed to the sides of the chassis bars or longitudinal bars 47, respectively.

As has been mentioned the front wheels of the motor vehicle are supported upon front axle (not shown) which may be supported below the front end of chassis 10 at a point preferably rearwardly of plate 24.

Figure 7:
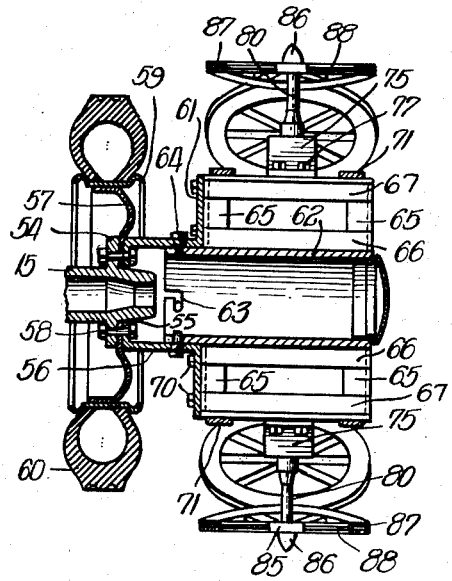
Fig. 7 is a cross sectional view through the wheel, substantially taken on line 7—7 of Fig. 6, together with a cross section of an automobile wheel, illustrating the details of the construction of both wheels and the details of their interconnection.

Referring to the wheel construction, best shown in Fig. 7, the same includes a vertical flange 54 extending in a radial relation from said wheel hub 15. Coacting with said flange 54 is flange 55 which extends inwardly of tubular member 56.

Positioned between two flanges 54 and 55 is the inner rim portion of disk 57 wherein the same is clamped and held in position by means of plurality of bolts or screws 58. The outer peripheral portion of said disk 57 supports wheel rim 59 upon which tire 60 is supported.

Outwardly extending from the opposite end of said tubular member 56 is flange 61. Disengageably connected with said tubular member 56 and said flange 61 is the wheel, presently described for propelling the automotive sleigh upon ice or snow when the motor vehicle has been converted into a sleigh as hereinabove described.

At the center of the wheel is cylinder 62, provided at its inner end with a plurality of bayonet slots 63 to which the inner ends of bolts 64 are caused to enter when said cylinder 62 has been properly turned, for the purpose of engaging said cylinder 62 with said tubular member 56.

Figure 8:
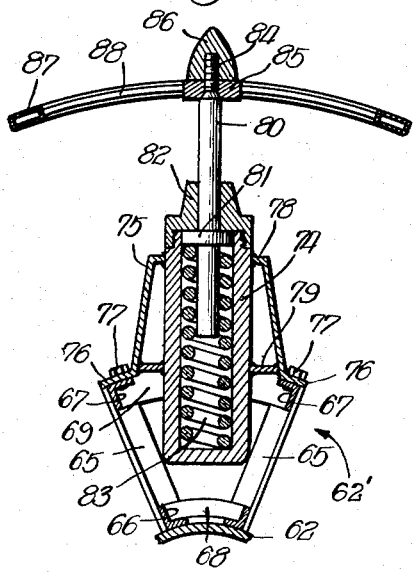
Fig. 8 is a longitudinal cross sectional view through a spoke mounting and the cage within which the same is supported.

Set upon said cylinder 62 in an encompassing relation is a plurality of cages, generally indicated by 62' in Fig. 8, for supporting a plurality of spokes. Each of said cages embodies four angle members 65, which remain in a radial relative position with respect to said cylinder 62. A pair of inner angle members 66, which are in an axial contacting relation with said cylinder 62, connect the inner ends of a pair of side members 65. A pair of outer angle members 67 connect the outer ends of a pair of side members 65. A pair of inner transverse members 68, one at each end of the cage, connects the inner ends of a pair of said members 65 and the ends of said inner angle members 66. A pair of outer angle members 69 connect the outer ends of a pair of said members 65 and the ends of members 67.

Angle members 68 are arcuate corresponding to the arc of cylinder 62, and with one of their faces may contact the outer periphery of said cylinder 62. Angle members 69 are likewise arcuate conforming to the arc of said cylinder 62 and are disposed in a transverse parallel relation therewith. The several angle members 65 to 69 are mutually interconnected by their contacting ends by means of welding or any other suitable means.

For the purpose of maintaining the several cages in the operative position with the wheel a plurality of screws 70 are passed through flange 61 and the angle members 65, 68 or 69, which are nearest disposed with relation to the automobile wheel shown in Fig. 7. In addition, in order to maintain the several cages bound to each other as well as to the cylinder 62 a pair of transverse hoops 71 are passed around the cages, in a transverse relation therewith and in contact with the outer faces of angle members 67. Each of said hoops 71 is made of a single strip of material, provided with outwardly bent ears 72 (Fig. 6), and the pair of said ears tightened by means of a bolt and nut fastener 73.

Figure 6:
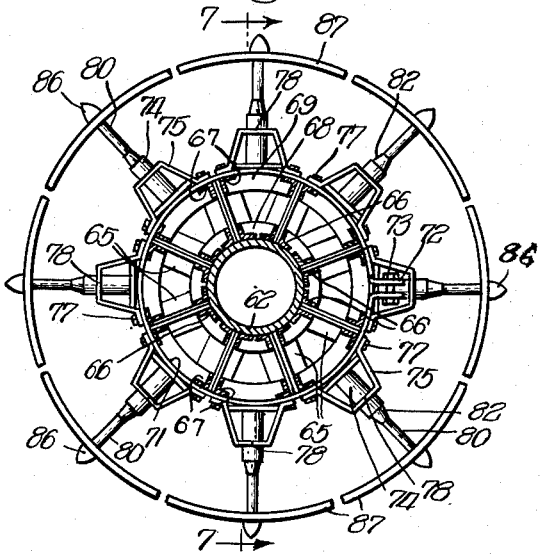
Fig. 6 is a side elevational view, partly in section, of the wheel for propelling the sleighs.

Set within each of the said cages at the center thereof is spoke supporting cylinder 74 having its inner end sealed. Yoke 75 has flanged ends 76 in contact with the outer faces of a pair of outer angle members 67 to which they are connected by means of bolts and nuts 77. Each of said yoke members 75 is substantially of a U-shaped formation, as is seen in Fig. 6, its central portion 78 being provided with an opening through which said cylinder 74 is passed. The portion 78 of said yoke 75 adjacent the said opening is welded or otherwise firmly attached to the outer end of said cylinder 74, as is seen in Fig. 8.

For the purpose of further supporting said cylinder 74 in association with each cage aforesaid and with said yoke 75 plate 79 is provided. Said plate 79 has a central opening through which said cylinder 74 is passed, the latter being welded to said plate adjacent its opening. The ends of said plate 79 are welded or otherwise firmly affixed to the adjacent ends of said yoke 75, all as seen in Fig. 8.

Entered through the outer open end of said cylinder 74 is the inner end of spoke rod 80, which intermediately of its ends is provided with collar 81, of a diameter substantially corresponding to the inner diameter of said cylinder 74, and wherein the same is set for a longitudinal sliding movement. Normally said collar 81 remains in contact with the inner end of cap 82 in a threaded engagement with the outer end of said cylinder 74. This normal position of collar 81 is due to the action of coil spring 83 interposed between said collar 81 and the inner end of cylinder 74 and encompassing the inner end of said spoke rod 80. It is noted that the inner end of spoke rod 80 normally extends within said cylinder 74 to about ½ of the length of the latter, allowing for sliding movement of said spoke rod 80 and collar 81 within said cylinder 74 and to the extent permitted by the contraction of said spring 83 when under pressure by said collar 81.

The outer reduced end of spoke rod 80 is threaded, as at 84 to receive hub 85. Cap 86 in threaded engagement with the free reduced end of said spoke rod 80 clamps said hub 85 and maintains the same in a rigid relation with said spoke rod 80.

Wheel 87, which may be made out of hollow flattened tubular metallic material, is connected through a plurality of radial rods 88 with said hub 85. Thus said hub 85, wheel 87 and rods 88 define a spider capable of engaging the frozen ground, ice or snow for propelling the sleigh. As is seen in Fig. 6 there is a plurality of such spiders. Each spider is of arcuate formation and all of said spiders define a circle in parallelism with hoops 71. This arrangement permits easy yielding of the spiders and of the spoke rods 80 as the former engage the ground and against the action of springs 83.

In the operative position of the wheels shown in Figs. 6, 7 and 8, the several spiders, spoke rods 80 and caps 86 are so arranged that said wheels 87 are disposed below the ground contacting surfaces of the runners in sleds 17 and 18 were said runners raised from the ground. This is for the purpose of eliminating shifting to any great extent of spoke rods 80 and collars 81 within cylinders 74.

From the hereinabove description it will be further seen that the sleigh propelling wheels may be readily disconnected from automobile wheels by first unscrewing screws 70, and then turning cylinder 62 for disconnecting the same from bolt 64.

It is further observed that the cages supporting yokes 75 and cylinders 74 in case of damage may be readily removed from the assembly of the wheel by removing screws 70 and hoops 71, and new ones substituted in lieu thereof. Since cylinder 74 with its traction appurtenances along with yoke 75 defines a single unit the same may be also removed from the respective cage on removing bolts 77 for replacing the same in case of breakage.

From one aspect of the invention said cylinder 74 and spoke rod 80 may be considered as a spoke for the traction wheel, which may be capable of removal as a unit from its respective cage, together with its yoke 75.

While there is described herein preferred embodiments of the present invention, it is nevertheless to be understood that minor changes may be made therein without departing from the spirit and scope of the invention as claimed.

What I claim as new is:

1. In an automobile sleigh a propelling device comprising a wheel hub, a horizontal cylindrical member extending axially of said hub, a plurality of sector-like cages defined by four corner radially extending angle irons connected at their inner and outer ends by longitudinal angle irons and transverse arcuate members arranged around and secured to said cylindrical member, a spoke rod having a pointed outer end supported by each of said cages in a radial relation with said horizontal cylindrical member, disengageable means for rigidly supporting said cages and cylindrical member from said hub, a plurality of cylinders, means rigidly but detachably securing one of said cylinders to each of said cages in radial relation with said cylindrical member, said spoke rod extending into the bore of each said cylinders for sliding movement thereof axially of each of said cylinders, a resilient member in the bore of each of said cylinders bearing against said spoke rod for normally maintaining the latter in an extended position with relation to each of said cylinders, a second hub secured at the outer free end of each of said spoke rods intermediate the pointed end and said cage, and an arcuate spider supported upon said second hub and having a surface engaging portion located toward the outer side of said second hub, the several spiders being adapted to successively engage the sleigh supporting device when a rotary movement is imparted to the propelling device.

2. The propelling device defined in claim 1, wherein said means rigidly but detachably securing one of said cylinders to each of said cages includes an inverted U-shaped yoke secured to the cylinder, said yoke being disengageably affixed to each of said cages.

References Cited in the file of this patent

UNITED STATES PATENTS

| | | |
|---|---|---|
| 1,186,232 | Ross | June 6, 1916 |
| 1,297,631 | Allen | Mar. 18, 1919 |
| 1,301,554 | Good | Apr. 22, 1919 |
| 1,394,376 | Urbano | Oct. 18, 1921 |
| 1,395,111 | Hollifield | Oct. 25, 1921 |
| 1,687,455 | Klein | Oct. 9, 1928 |
| 1,777,964 | Dunster | Oct. 7, 1930 |
| 1,937,923 | Taylor | Dec. 5, 1933 |
| 2,664,962 | Faszczuk | Jan. 5, 1954 |

FOREIGN PATENTS

| | | |
|---|---|---|
| 55,676 | Austria | Oct. 10, 1912 |